(12) United States Patent
Satou et al.

(10) Patent No.: US 6,459,668 B1
(45) Date of Patent: Oct. 1, 2002

(54) DISK TYPE REPRODUCING APPARATUS AND REVOLUTION CONTROL METHOD

(75) Inventors: Yoshihiro Satou, Ibaraki-ken; Shinobu Yoshida, Tsuchiura; Yoshiaki Yamauchi, Ibaraki-ken; Hiroyuki Tanaka, Aichi-ken; Tomoki Hirata, Yokohama; Takashi Ishikawa, Hiratsuka; Hisahiro Miki, Chigasaki; Hisanobu Tajima, Hitachinaka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/406,836

(22) Filed: Sep. 28, 1999

(30) Foreign Application Priority Data

Sep. 28, 1998 (JP) ............................................ 10-272902

(51) Int. Cl.$^7$ ................................................. G11B 7/00
(52) U.S. Cl. ...................... 369/47.39; 369/263; 369/266
(58) Field of Search ........................... 369/47.36, 47.44, 369/53.12, 53.13, 53.14, 53.15, 266, 263

(56) References Cited

U.S. PATENT DOCUMENTS

| | | | | |
|---|---|---|---|---|
| 5,623,382 A | * | 4/1997 | Moritan et al. | ........... 369/99.09 |
| 5,844,866 A | * | 12/1998 | Fujimoto et al. | ............. 369/50 |
| 5,926,449 A | * | 7/1999 | Hiok et al. | .................. 369/54 |
| 6,314,077 B1 | * | 11/2001 | Shishido et al. | ............ 369/263 |

* cited by examiner

Primary Examiner—Nabil Hindi
(74) Attorney, Agent, or Firm—Antonelli, Terry, Stout & Kraus, LLP

(57) ABSTRACT

The number of revolutions of a disk is once increased to a higher level than a resonance frequency of a rotation support system at the startup of rotation of the disk, and subsequently servo control for a pickup actuator is made to work to read information from the disk. It is possible to increase reproducibility of the disk unbalance correction and improve the apparatus in reliability without generation of vibrations and noises, and to spin the disk at high speed.

4 Claims, 2 Drawing Sheets

DISK TYPE REPRODUCING APPARATUS AND REVOLUTION CONTROL METHOD

BACKGROUND OF THE INVENTION

1. Field of the Invention

The invention relates to an exchangeable-type disk apparatus, such as CD-ROMs, DVDs, MOs and removable HDDs, and more particularly to a disk-type reproducing apparatus in which the influence of unbalanced vibration of a disk is reduced.

2. Description of the Related Art

Most software for computers has been distributed in the form of CD-ROMs, and in order to reduce the installation time for such CD-ROMs and to afford comfortably enjoying games and so on, it has been required to increase the data transfer speed. To achieve this, it is necessary to turn (spin) a disk at high speed. A major problem encountered in this case is an increase in vibrations due to unbalance of the disk. In order to reduce the vibrations, Japanese Patent Unexamined Publication No. 10-083622 has proposed a method in which support legs of a rotating system are made sufficiently flexible to set the resonance frequency of the support system to a lower level than an operating revolution frequency, and the apparatus is operated in such overcritical condition that a balancer mounted in the rotating system corrects unbalance of the disk.

In the above prior art technique, the balancer comprises a spherical body (ball), and such spherical body rolls in a groove provided at a center of rotation to correct the unbalance. However, when the disk spins at a speed near the resonance frequency of the rotating system, the ball unsteadily moves in the rolling groove to cause unstable vibrations, thus producing vibrations and noises, and furthermore there has been a problem that servo for a disk reading system does not work to make reading of information impossible.

It is an object of the invention to provide a disk apparatus which eliminates a phenomenon that servo is made out of control by unstable vibrations developed when a disk is spun at a speed near the resonance frequency of the rotation support system of the above unbalance correcting mechanism.

SUMMARY OF THE INVENTION

The above object of the invention can be attained by positioning a ball in a position of correction while once increasing revolutions of a disk above the resonance frequency of the rotation support system when the disk is started to spin, and thereafter decreasing the revolutions to execute actuation of the servo.

DESCRIPTION OF THE PREFERRED EMBODIMENTS

Figure 1:
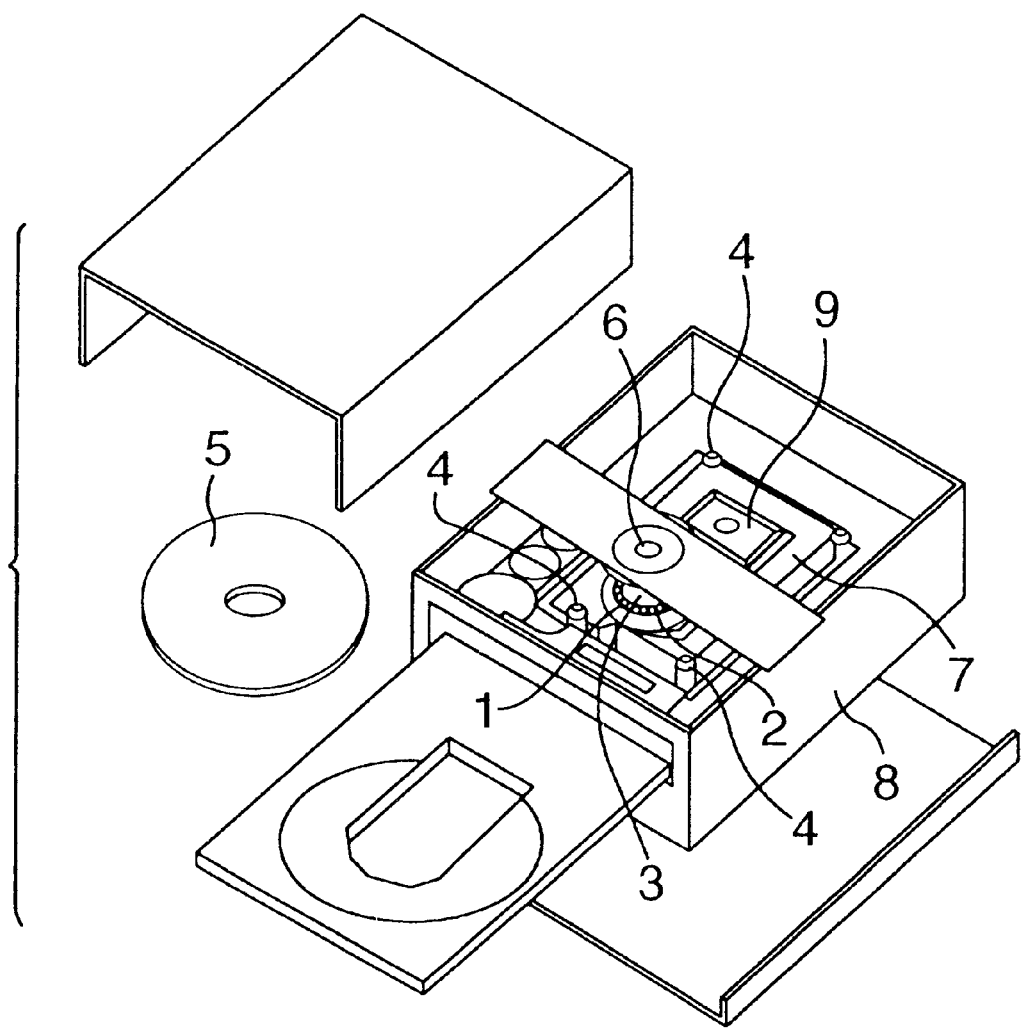
FIG. 1 is a view showing respective embodiments of the invention applied to, for example, a CD-ROM apparatus.
Figure 2:
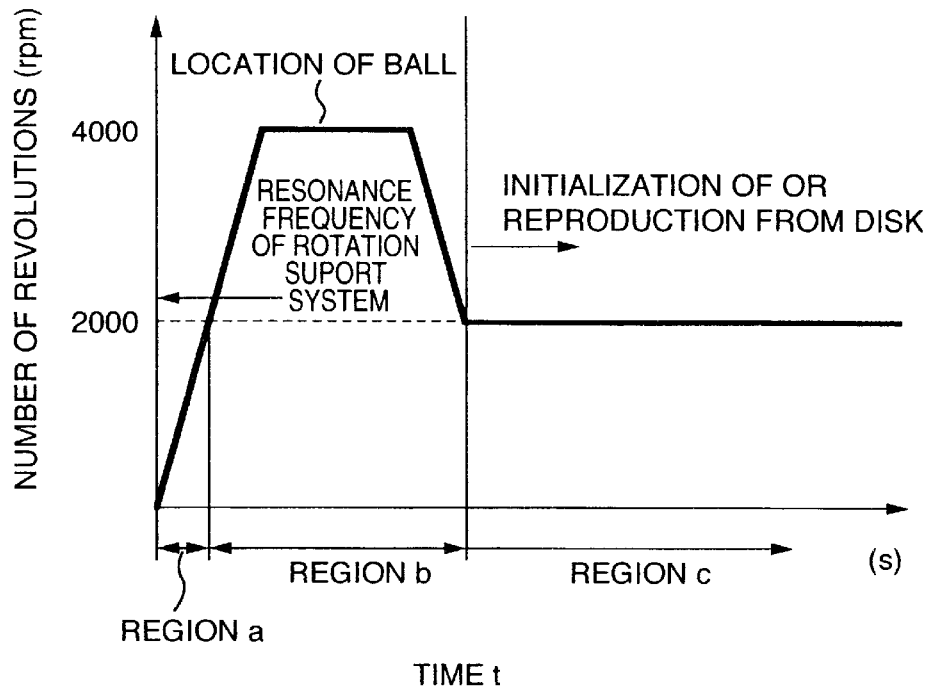
FIG. 2 is a diagram illustrative of the embodiments of the invention.

A first embodiment of the invention will now be described with reference to FIGS. 1 and 2. FIG. 1 is a view showing an optical disk apparatus embodying the invention. FIG. 2 is a diagram illustrative of a rotation pattern in the invention.

In FIG. 1, a disk 5 in the form of a circular plate is placed on a disk tray to be loaded into the apparatus. The thus loaded disk 5 is set on a rotating shaft of a spindle motor 3, and is fixed to the rotating shaft by a disk clamper 6. Provided on the rotating shaft is an unbalance correcting mechanism, which comprises a rolling groove 2 formed in a disk support boss of the rotating shaft, and an unbalance correcting ball 1 received in the rolling groove 2. There is further provided a pickup actuator 9 provided with a reproducing head for reading information recorded on the disk 5. The spindle motor 3 and the pickup actuator 9 are mounted on a unit mechanical chassis 7 to be supported on a chassis 8 through a rotation support system 4.

In the embodiment, after the disk is increased in revolutions and the ball for correcting unbalance of the disk becomes stable, the number of revolutions is decreased up to such a level that servo control works, and tracking servo control is made to work.

A correcting action will be described below with reference to FIG. 2. A focusing servo control is made to work in a condition (region a), in which the disk 5 becomes stationary. Rotation is started and is increased to a higher level than a resonance frequency of the rotation support system (region b). Thereafter, the disk is decreased in revolution, and tracking servo control is made to work (region c). This is because vibrations attributable to unbalancing develop in plane of rotation to permit a more burden in a tracking direction than in a focusing direction to generate, so that, while rotation is starting, if support legs have a small attenuation coefficient, the disk vibrates much when the number of revolutions of the disk coincides with the resonance frequency of the rotation support system, which leads to the possibility that the tracking servo control comes out of action.

Conditions, in which servo control does not work in the embodiment and in the prior art will be described below. The embodiment and the prior art were compared with each other. In the comparison, rotation support systems had a resonance frequency of 30 Hz, the number of revolutions of 4,000 r.p.m (66.7 Hz) at the startup, and the number of revolutions of 2,000 r.p.m. (33.3 Hz) after the startup adjustment. The prior art used a system, in which both focusing servo control and tracking servo control worked at the startup.

Results of the comparison are indicated in Table 1. In the system making use of the embodiment, startup of rotation of the disk could be effected without any trouble. In the prior art example, however, vibrations of the rotation support system caused tracking servo control not to work at the startup of rotation of the disk, resulting in a retry operation.

TABLE 1

Servo Condition at the Startup of Rotation in the Embodiment

|  | The Embodiment | Prior Art Example |
| --- | --- | --- |
| Servo condition | Not abnormal | Tracking servo control does not work |

Thus, the embodiment can provide an optical disk apparatus capable of transferring information at high speed without a burden on the servo system.

A second embodiment of the invention will be described with reference to FIGS. 1 and 2. A feature of this embodiment resides in that focusing servo control and tracking servo control are made to work in a state, in which after the startup of rotation of a disk the number of revolutions of the disk is decreased to such a level that servo control can work.

A correcting action will be illustrated with reference to FIG. 2. Spinning of the disk raises the number of revolutions of the disk above a resonance frequency of the rotation support system (region b). Then, tracking and focusing servo controls are made to work (region c). Thereafter, information is reproduced (read) from the disk.

Conditions, in which servo control works in the embodiment and in the prior art will be described below. Rotation support systems were the same in a resonance frequency, the number of revolutions at the startup, and the number of revolutions after the startup, as in the first embodiment. The prior art used a system, in which both focusing servo control and tracking servo control worked at the startup.

Results of the comparison are indicated in Table 2. In the system making use of the embodiment, startup of rotation of the disk could be effected without any trouble. In the prior art example, however, vibrations of the rotation support system caused tracking servo control not to work at the startup of rotation of the disk, resulting in a retry operation.

TABLE 2

Servo Condition at the Startup of Rotation

|  | The Embodiment | Prior Art Example |
| --- | --- | --- |
| Servo condition | Not abnormal | Tracking servo control does not work |

Thus, the embodiment can provide an optical disk apparatus capable of transferring information at high speed without a burden on the servo system.

Figure 3:
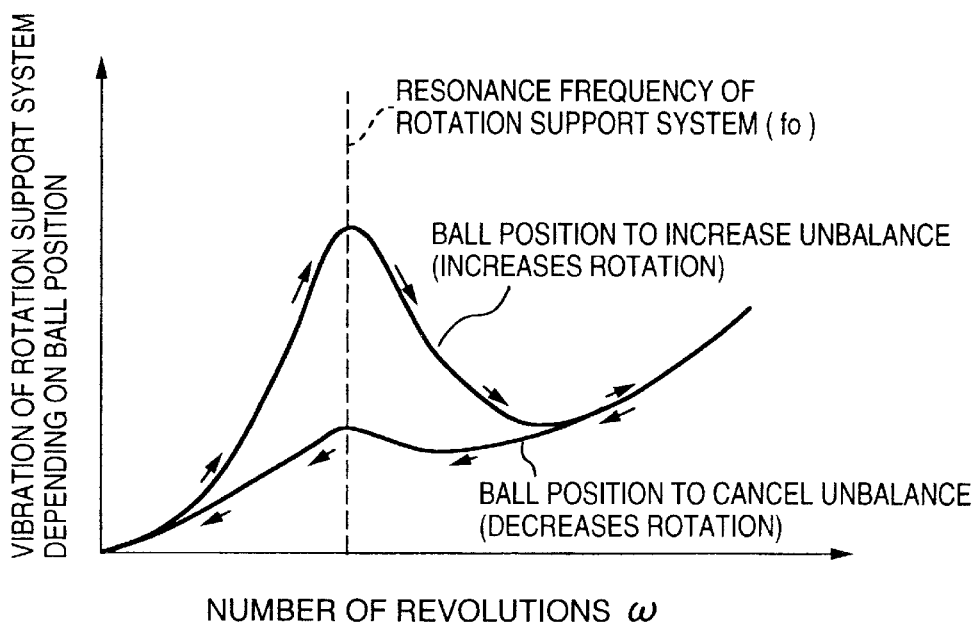
FIG. 3 is a diagram illustrative of vibrations of a rotation support system corresponding to positions of a ball when the number of revolutions varies.

A third embodiment of the invention will be described with reference to FIG. 3. FIG. 3 is a diagram illustrating vibrations of the rotation support system depending on a position of a ball when the number of revolutions changes.

A feature of this embodiment comprises controlling a disk drive motor (spindle motor 3) such that after the disk 5 is loaded, the number of revolutions of the disk is once increased to a higher level than a resonance frequency of the rotation support system at the startup of rotation of the disk, and then the number of revolutions is made to enable initializing the disk or reproducing information from the disk.

As shown in FIG. 3, the unbalance correcting mechanism, which employs the ball 1, makes use of hysteresis in positions where the ball becomes stationary at the startup of rotation and at the time when rotation decreases.

The embodiment and an example of the prior art will be described. For example, rotation support systems had a resonance frequency of 30 Hz, the number of revolutions of 4,000 r.p.m (66.7 Hz) at the startup, and the number of revolutions of 2,000 r.p.m. (33.3 Hz) after the startup adjustment. The example of the prior art employed a pattern, in which the number of revolutions was simply increased to 2,000 r.p.m. without any startup adjustment. For the above-mentioned systems, positions of the ball after the startup of rotation are shown in Table 3. It is revealed that an error in an amount of correction is small when the ball is positioned just opposite to an unbalance direction, that is, at an angle of 180 degrees relative to the unbalance direction.

TABLE 3

Comparison of Ball Arranging Position

|  | The Embodiment | Example of the Prior Art |
| --- | --- | --- |
| Angle of ball relative to unbalance direction (degree) | 170~180 | 120~160 |

In the embodiment, the ball 1 was moved to a position at an angle of substantially 180 degrees relative to the unbalance direction when the number of revolutions reaches 2,000 r.p.m. after the startup of rotation of the disk. In contrast, in the example of the prior art, the ball 1 did not settle in a position opposite to the unbalance direction. Of course, the system of the embodiment involved smaller vibrations than the system in the example of the prior art did. As described above, it is possible to provide a disk type reproducing apparatus having high reliability and capable of enhancing accuracy of unbalance correction by increasing, when the disk 5 spins at speed around the resonance frequency of the rotation support system, the number of revolutions to a level higher than the resonance frequency of the rotation support system so as to cause the ball 1 to settle once in a corrected position, and thereafter making the number of revolutions a predetermined level.

According to the invention, it is possible to increase reproducibility of the disk unbalance correction and improve the apparatus in reliability without generation of vibrations and noises, and to spin the disk at high speed.

What is claimed is:

1. A disk type reproducing apparatus comprising a spindle motor for rotating an exchangeable disk in the form of a circular plate, a reproducing head for reading at least information on the disk, and a movable member capable of moving about an axis of rotation, and wherein only a focusing servo control works at the startup of rotation of the disk to make the number of disk revolutions increase to a higher level than a resonance frequency of a rotating system so that the movable member moves to a substantially stable position for correcting unbalanced rotation of the disk, and after the movable member moves to the substantially stable position, the number of revolutions of the disk is decreased to such a level as to permit a tracking servo control to work, and at least the tracking servo control is caused to work to reproduce the information from the disk.

2. The apparatus according to claim 1, wherein after the number of revolutions of the disk is decreased to such a level as to permit the tracking servo control to work, both of the focusing servo control and the tracking servo control are made to work to reproduce the information from the disks.

3. A revolution control method for a disk-type reproducing apparatus, which functions to correct unbalanced rotation of an exchangeable disk in the form of a circular plate by moving a movable member to a substantially stable position for correcting the unbalanced rotation of the disk, spins the disk and reproduces at least information from the disk, said method comprising the steps of adding a processing for increasing the number of revolutions of the disk once to a higher level than a resonance frequency of a rotation support system at the startup of rotation of the disk so that the movable member moves to a substantially stable position while operating only a focusing servo control, and after the movable member moves to the substantially stable position, decreasing the number of revolutions of the disk to a level to permit operation of a tracking servo control, and at least operating the tracking servo control so as to reproduce information from the disk.

4. The apparatus according to claim 3, wherein after decreasing the number of revolutions of the disk, operating both the tracking servo control and the focusing servo control so as to reproduce information from the disk.

* * * * *